(12) United States Patent
Staffend (10) Patent No.: US 7,650,754 B2
(45) Date of Patent: Jan. 26, 2010

(54) TRANSMISSION BETWEEN ROTARY DEVICES

(76) Inventor: Gilbert Staffend, 24093 Tana Ct., Farmington, MI (US) 48335-3401

( * ) Notice: Subject to any disclaimer, the term of this patent is extended or adjusted under 35 U.S.C. 154(b) by 359 days.

(21) Appl. No.: 11/532,385

(22) Filed: Sep. 15, 2006

(65) Prior Publication Data

US 2007/0006672 A1    Jan. 11, 2007

Related U.S. Application Data

(63) Continuation-in-part of application No. 11/133,824, filed on May 20, 2005, now Pat. No. 7,556,015.

(60) Provisional application No. 60/718,029, filed on Sep. 16, 2005, provisional application No. 60/572,706, filed on May 20, 2004.

(51) Int. Cl.
   *F01K 1/00* (2006.01)
   *F16H 21/00* (2006.01)

(52) U.S. Cl. .................. 60/643; 74/22 A; 74/665 F; 74/665 H (58) Field of Classification Search ................. 123/231; 60/643, 645; 74/22 A, 63, 664, 665 G, 665 K, 74/416, 417, 665 F, 665 H
See application file for complete search history.

(56) References Cited

U.S. PATENT DOCUMENTS

| | | |
|---|---|---|
| 1,349,353 A | 8/1920 | Wilber |
| 1,493,826 A | 5/1924 | Small |
| 2,294,647 A | 9/1942 | Ames |
| 2,382,591 A | 8/1945 | Warren |
| 2,409,141 A | 10/1946 | Margolis |
| 2,636,480 A | 4/1953 | Becker |
| 2,728,330 A | 12/1955 | Peterson |
| 2,762,346 A | 9/1956 | White |
| 2,786,421 A | 3/1957 | Prendergast |
| 2,821,176 A | 1/1958 | Koser et al. |
| 3,118,432 A | 1/1964 | Peterson |
| 3,151,806 A | 10/1964 | Whitfield |
| 3,171,391 A | 3/1965 | Appleton |
| 3,276,386 A | 10/1966 | Fanshawe |
| 3,280,804 A | 10/1966 | Hellbaum |
| 3,333,481 A * | 8/1967 | Kulig ........................... 74/417 |
| 3,385,497 A * | 5/1968 | Taraborrelli ................. 226/178 |
| 3,467,070 A | 9/1969 | Green |
| 3,529,480 A * | 9/1970 | Kaspareck ..................... 74/63 |

(Continued)

FOREIGN PATENT DOCUMENTS

EP    416977 A1    3/1991

(Continued)

*Primary Examiner*—Hoang M Nguyen
(74) *Attorney, Agent, or Firm*—Dickinson Wright PLLC (57) ABSTRACT

The present invention is a system for translating angular rotation between rotary components. The system includes a rotor and a contact wheel. The rotor is rotatable about a rotary axis at a rotary angular velocity. The rotor includes a radial distance which extends between an exterior radius and an interior radius. The contact wheel is rotatable about a contact axis at a contact angular velocity. The contact axis extends in parallel relationship to the radial distance. The contact wheel is disposed in rotational contact with the radial distance. Rotation of one of the rotor and contact wheel is translated to rotate the other one of the rotor and contact wheel by virtue of the rotational contact between the rotor and contact wheel.

12 Claims, 4 Drawing Sheets

U.S. PATENT DOCUMENTS

| | | | |
|---|---|---|---|
| 3,548,790 A | 12/1970 | Pitts | |
| 3,568,645 A | 3/1971 | Gtimm | |
| 3,572,030 A | 3/1971 | Cuff | |
| 3,727,589 A | 4/1973 | Scott | |
| 3,745,979 A | 7/1973 | Williams | |
| 3,780,708 A | 12/1973 | Angsten | |
| 3,797,464 A | 3/1974 | Abbey | |
| 3,807,243 A * | 4/1974 | Yada | 74/63 |
| 3,865,085 A | 2/1975 | Stenbert | |
| 3,871,248 A * | 3/1975 | Barish | 74/665 P |
| 3,931,810 A | 1/1976 | McGathey | |
| 3,964,450 A | 6/1976 | Lockshaw | |
| 3,973,525 A | 8/1976 | Keylwert | |
| 4,120,235 A * | 10/1978 | Beck et al. | 493/203 |
| 4,157,011 A | 6/1979 | Liddle | |
| 4,169,451 A | 10/1979 | Niggemeyer | |
| 4,241,713 A | 12/1980 | Crutchfield | |
| 4,362,480 A | 12/1982 | Suzuki et al. | |
| 4,552,107 A | 11/1985 | Chen | |
| 4,599,059 A | 7/1986 | Hsu | |
| 4,770,084 A | 9/1988 | Miwa et al. | |
| 5,056,314 A | 10/1991 | Paul et al. | |
| 5,184,526 A | 2/1993 | Watanabe | |
| 5,233,886 A * | 8/1993 | Bossler, Jr. | 74/665 F |
| 5,413,011 A * | 5/1995 | Fragnito | 74/63 |
| 5,433,179 A | 7/1995 | Wittry | |
| 5,494,014 A | 2/1996 | Lobb | |
| 5,524,587 A | 6/1996 | Mallen et al. | |
| 5,531,197 A | 7/1996 | Lobb | |
| 5,595,154 A | 1/1997 | Smith | |
| 5,622,149 A | 4/1997 | Wittry | |
| 5,640,938 A | 6/1997 | Craze | |
| 5,895,210 A | 4/1999 | Nakaniwa et al. | |
| 6,015,279 A | 1/2000 | Yamane | |
| 6,125,814 A | 10/2000 | Tang | |
| 6,178,633 B1 | 1/2001 | Yamane | |
| 6,179,596 B1 | 1/2001 | Weisener et al. | |
| 6,227,833 B1 | 5/2001 | Froslev et al. | |
| 6,264,451 B1 | 7/2001 | Murayama et al. | |
| 6,543,225 B2 | 4/2003 | Scuderi | |
| 6,551,083 B2 | 4/2003 | Weisener et al. | |
| 6,588,395 B2 | 7/2003 | DeFazio | |
| 6,609,371 B2 | 8/2003 | Scuderi | |
| 6,643,927 B2 | 11/2003 | Murayama et al. | |
| 6,722,127 B2 | 4/2004 | Scuderi et al. | |
| 6,880,502 B2 | 4/2005 | Scuderi | |
| 6,932,588 B2 | 8/2005 | Choi et al. | |
| 6,986,329 B2 | 1/2006 | Scuderi et al. | |
| 7,017,536 B2 | 3/2006 | Scuderi | |
| 2005/0042077 A1 | 2/2005 | Gekht et al. | |

FOREIGN PATENT DOCUMENTS

WO 0246581 A1 6/2002

* cited by examiner

TRANSMISSION BETWEEN ROTARY DEVICES

CROSS REFERENCE TO RELATED APPLICATION

This application claims the benefit U.S. Provisional Patent Application Ser. No. 60/718,029 filed Sep. 16, 2005 and is a continuation-in-part of U.S. patent application Ser. No. 11/133,824 filed on May 20, 2005, which claimed priority to U.S. Provisional Patent Application Ser. No. 60/572,706 filed May 20, 2004, and is related to U.S. Ser. No. 11/532,376, filed on the same date as this application and entitled "Method of Forming a Rotary Device", and is related to U.S. Ser. No. 11/532,366, filed on the same date as this application and entitled "Method of Decoupling Using a Rotary Device," which are hereby incorporated by reference.

BACKGROUND OF THE INVENTION

1. Field of the Invention

The invention generally relates to a system for translating power between rotary devices.

2. Description of the Related Art

Traditional rotary devices are connected to rotate in a fixed relationship. An example of system where rotary devices connected to rotate in a fixed relationship is disclosed in U.S. Pat. No. 4,157,011 to Liddle (the '011 patent). In the '011 patent, pair of rotary devices, i.e., a compressor and a turbine, rotate each rotate about a rotary axis. A drive shaft extends along the rotary axis and interconnects the compressor and the turbine in a fixed rotational relationship. Therefore, the compressor and the turbine must rotate at the same fixed rotational velocity. To change the output of the compressor and turbine, a turbine power shaft extends from the turbine on the rotary axis and terminates at a pair of engine reduction gears. To vary the output of the compressor and turbine, a continuously variable transmission extends from the engines reduction gears.

This use of the engine reduction gears and the continuously variable transmission, which are external to the compressor and turbine, add complexity to the system. The complexity is in the form of added bulk in packaging and a lot of components external to the compressor and turbine. Additionally, there is no way to vary the rotational velocity of the compressor with respect to the turbine.

SUMMARY OF THE INVENTION AND ADVANTAGES

The present invention is a system for translating angular rotation between rotary components. The system includes a rotor and a contact wheel. The rotor is rotatable about a rotary axis at a rotary angular velocity. The rotor includes a radial distance which extends between an exterior radius and an interior radius. The exterior radius is larger than the interior radius. The contact wheel is rotatable about a contact axis at a contact angular velocity. The contact axis extends in parallel relationship to the radial distance. The contact wheel is disposed in rotational contact with the radial distance of the rotor for translating the rotation of one of the rotor and the contact wheel to the other one of the rotor and the contact wheel.

The present invention is also a system which includes a first and second rotor and a first and second contact wheel. The first rotor is rotatable about a rotary axis at a rotary angular velocity. The first rotor includes a first radial distance which extends between an exterior radius and an interior radius. The exterior radius is larger than the interior radius. The second rotor is rotatable about a second rotary axis at a second rotary angular velocity. The second rotor includes a second radial distance which extends between a second exterior radius and a second interior radius. The second exterior radius is larger than the second interior radius. The first contact wheel is disposed in rotational contact with the first radial distance of the first rotor. The second contact wheel is disposed in rotational contact with the second radial distance of the second rotor. The first and second contact wheels are rotatable about a contact axis at a contact angular velocity. The first and second contact wheels are movable radially on the respective first and second radial distance to vary the first rotary angular velocity with respect to the second rotary angular velocity.

The present invention is also a method of translating rotation between a rotor and a contact wheel. The method includes the steps of placing the contact wheel in rotational contact with the radial distance of the rotor and rotating one of the rotor and the contact wheel about the respective axis to cause the rotation of the other one of the rotor and the contact wheel about the respective axis via the rotational contact.

Because the contact wheel is disposed in rotational contact with the rotor, the rotation of the contact wheel on the contact axis is translated to the rotor on the rotary axis. By translating the rotation of the rotor through the contact wheel, rotation of the first rotor is translated to the second rotor or vice versa. The rotation can be further translated by radially moving the contact wheels along the respective radial distances to vary the rotary angular velocity of the first rotor with respect to the second rotor. This is important when one of the first and second rotors need to rotate at a rotary angular velocity which is different than the rotary angular velocity of the other of the first and second rotors. Additionally, by implementing contact wheels, external transmissions and drive systems can be eliminated which reduce the bulk, weight, and cost of the system.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention relates to a system 10 for translating angular rotation between rotary components, such as a plurality of rotary devices 20. A system is shown generally at 10 in FIG. 1.

Figure 5:
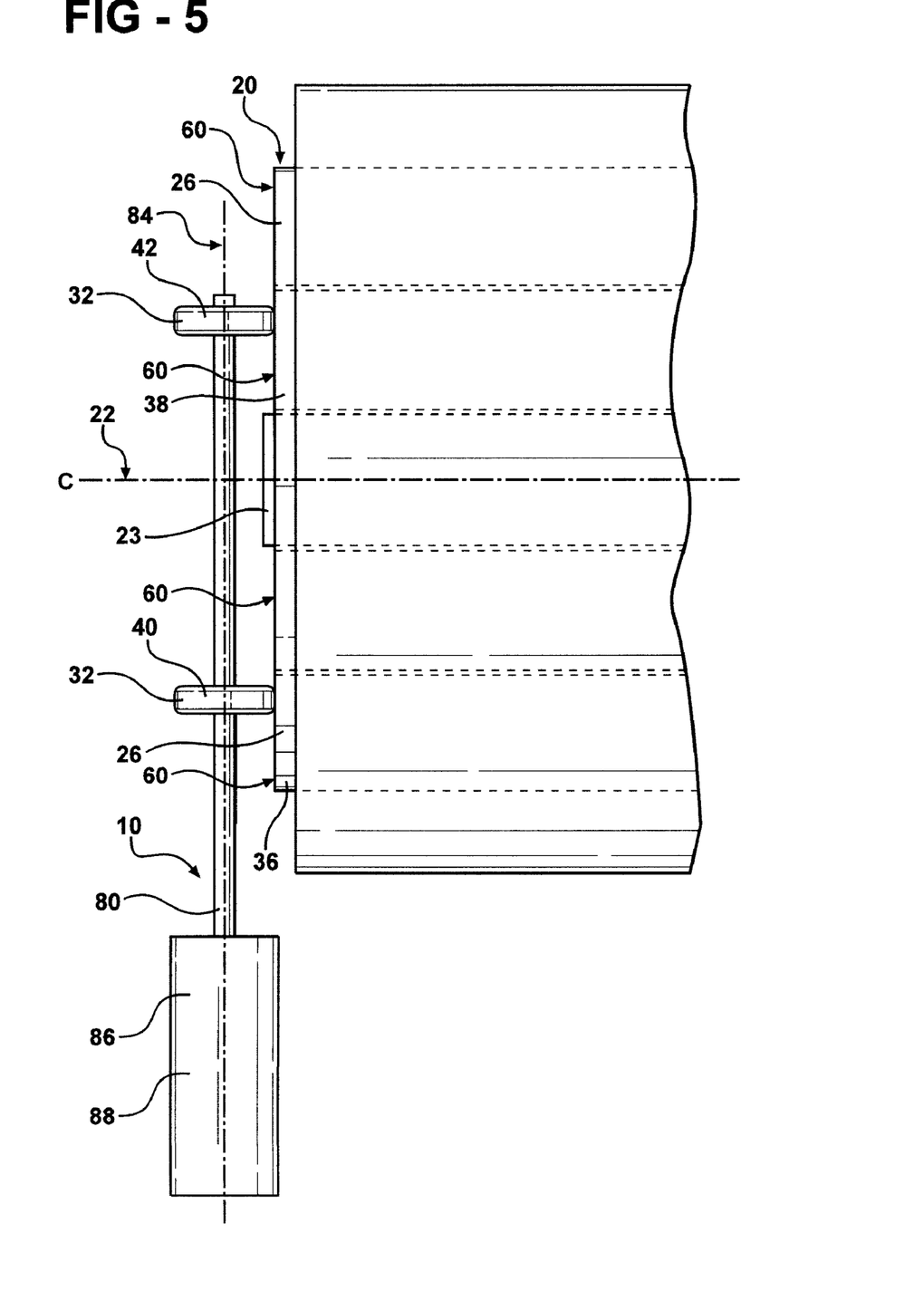
FIG. 5 is a side view of the pair of radially stacked rotary devices and the system for translating rotation between the rotors and the contact wheels.

Referring to the Figures, the rotary device 20 includes an outer hub 28 and an inner hub 30 disposed within the outer hub 28. Each of the hubs 28, 30 are generally centered about a rotary axis 22 such that one of the hubs 28, 30 rotates with respect to the other hub 28, 30 about the rotary axis 22. Each of the hubs 28, 30 represents either a stator 24 or a rotor 26 where the rotor 26 is rotatable with respect to the stator 24 about the rotary axis 22. Therefore, the stator 24 is static, i.e., the stator 24 does not rotate, and the rotor 26 is generally concentric with, and rotatable with respect to, the stator 24 about the rotary axis 22. In one embodiment, the stator 24 surrounds the rotor 26 on the rotary axis 22. In an alternative embodiment, the rotor 26 surrounds the stator 24 about the rotary axis 22. A bearing 23 may be disposed on the rotary axis 22 for facilitating rotation of the rotor 26 with respect to the stator 24, as shown in FIG. 5. Alternatively, the relative movement between the rotor 26 and the stator 24 may act as the only bearing. Additionally, the rotary devices 20 may be radially stacked, as illustrated in FIGS. 1, 3, 4, and 5. This means that a second rotary device 20 surrounds the first rotary device 20 on the rotary axis 22.

The inner and outer hubs 28, 30 for each rotary device 20 each include a peripheral wall, i.e., an inner peripheral wall and an outer peripheral wall 46. The inner and outer hubs 28, 30 may each include an inner side wall and an outer side wall 60. The outer side wall 60 is disposed in perpendicular relationship to an edge of the inner or outer 46 peripheral wall. The inner and outer 46 peripheral walls and the inner and outer 60 side walls cooperate to define working chambers between the rotor 26 and stator 24, i.e., inner and outer hub 28, 30, for working a fluid within the rotary device 20. Working the fluid may include compressing, expanding, combusting, etc. For example, the rotary device 20 may be a compressor for intaking and compressing a fluid. Alternatively, the rotary device 20 may be an expansion device for intaking and expanding the fluid. A single rotary device 20 may perform more than one function, i.e., compression and expansion, for example. Additionally, a plurality of rotary devices 20 may be combined to generate power from working the fluid.

The rotary device 20 works the fluid as the rotor 26 is rotated with respect to the stator 24. The degree that the fluid is worked depends on several variables, including the speed of the rotor 26 rotation. The system 10 is for varying the speed of the rotor 26 rotation. The system 10 includes a first and second rotor 36, 38 and a first and second contact wheel. The first contact wheel 40 is in contact with the first rotor 36 and the second contact wheel 42 is in contact with the second rotor 38. Preferably, the contact wheels 32 are in contact with the respective side wall on the exterior of the rotary device 20. This means that the first contact wheel 40 is in contact with the outer side wall 60 of the first rotor 26 and the second contact wheel 42 is in contact with the outer side wall 60 of the second rotor 26.

Figure 1:
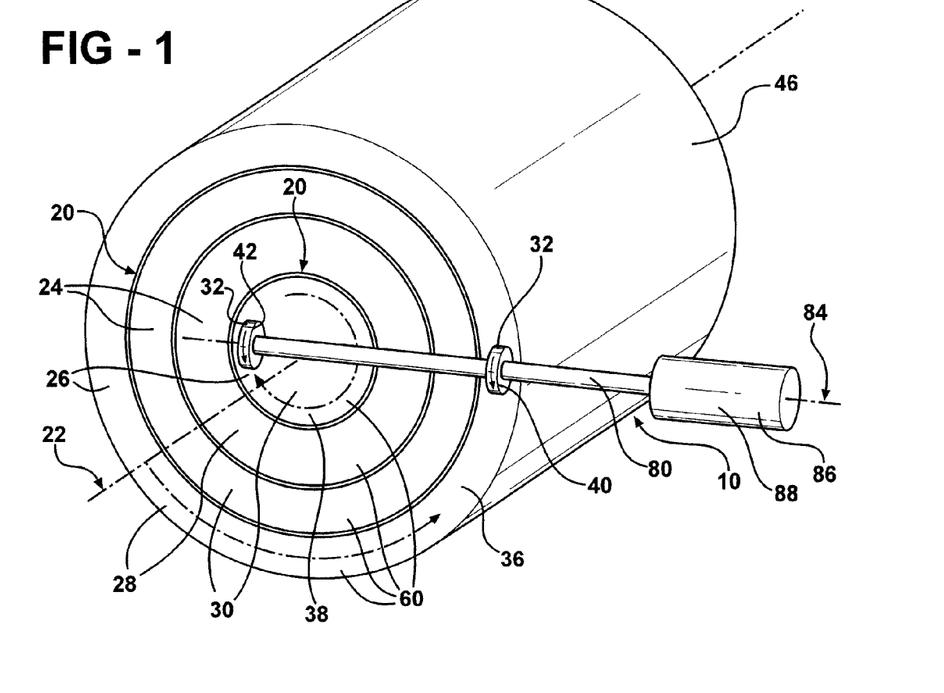
FIG. 1 is a perspective end view of a pair of radially stacked rotary devices and a system including a rotors and contact wheels for translating rotation between the rotary devices.
Figure 6:
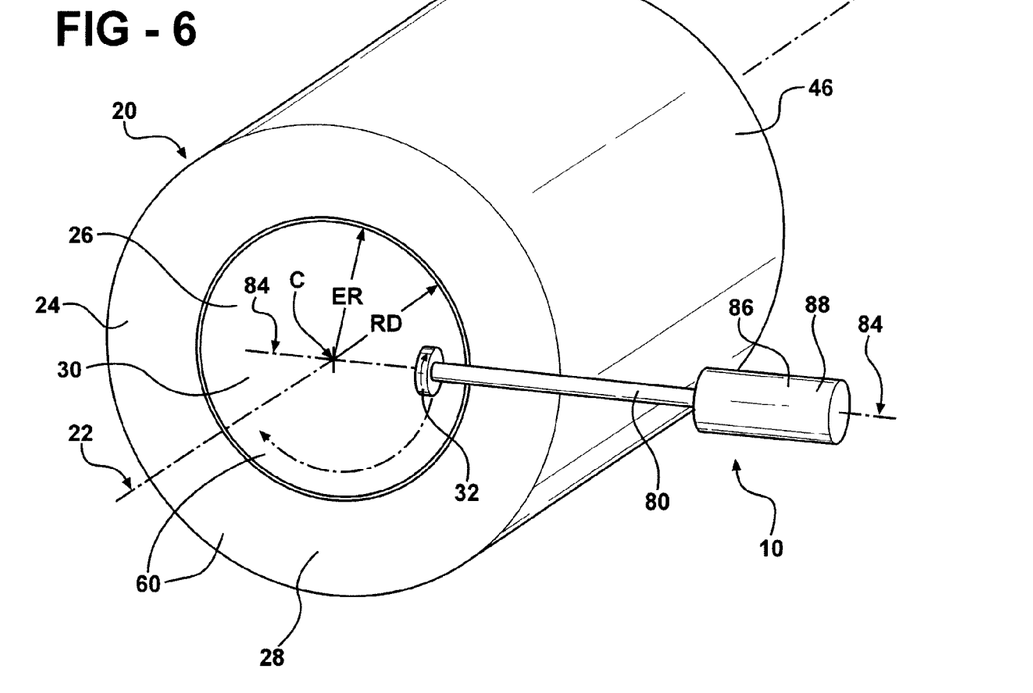
FIG. 6 is a perspective end view of a rotary device and a system including a rotor and a contact wheel for translating rotation between the rotor and the contact wheel.
Figure 7:
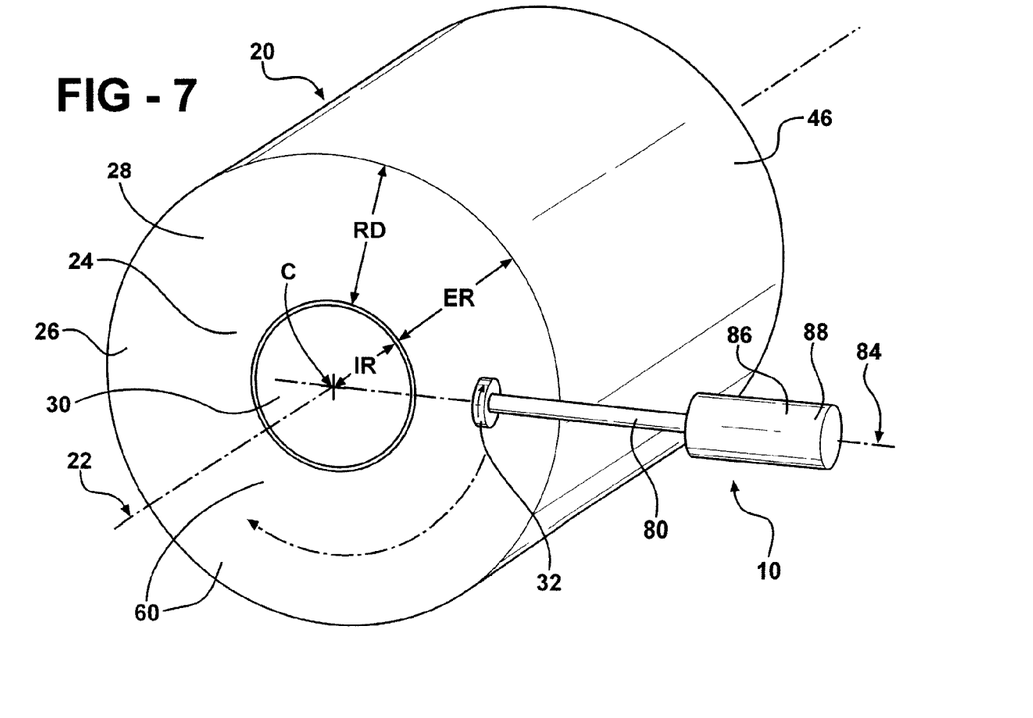
FIG. 7 is a perspective end view of the rotary device and the system for translating rotation between the rotor and the contact wheel.

Each rotor 26 is rotatable about the rotary axis 22 at a rotary angular velocity. The first rotary device 20 is rotatable about a first rotary axis 22 at a first angular velocity and the second rotary device 20 is rotatable about a second rotary axis 22 at a second angular velocity. The rotor 26 is preferably round and defines a center C. However, any other shape may be used so long as the rotor 26 is rotatable about the rotary axis 22. The rotary axis 22 extends through the center C of the rotor 26. The rotor 26 includes a radial distance RD which extends between an exterior radius ER and an interior radius IR. The radial distances RD extend radially from the center C of the rotor 26. Therefore, the first and second rotors 26 each include a radial distance RD which extends between an exterior radius ER and an interior radius IR. Each exterior radius ER is larger than the respective interior radius IR of the same rotor 26. If the rotor 26 is the inner hub 30, the interior radius IR is essentially equal to zero as the radial distance RD extends between the center C of the rotor 26 and the exterior radius ER, as shown in FIGS. 1 and 6.

The contact wheels 32 are rotatable about a contact axis 84 at a contact angular velocity. This means that a first contact wheel 40 is rotatable about a first contact axis 84 at a contact angular velocity and a second contact wheel 42 is rotatable about a second contact axis 84 at the contact angular velocity. Each contact axis 84 extends in parallel relationship to the respective radial distance RD and transverse to the respective rotary axis 22. Typically, each contact axis 84 is generally perpendicular to the respective rotary axis 22 unless the first and second contact wheels 40, 42 have different diameters. Additionally, each contact wheel 32 is disposed in rotational contact with the radial distance RD of the respective rotor 26 for translating the rotation of either the rotor 26 or the contact wheel 32 to the other one of the respective rotor 26 and contact wheel. This means that as the contact wheel 32 is being rotated about the contact axis 84, the rotor 26 is rotated about the rotary axis 22 by virtue of the contact of the contact wheel 32 with the rotor 26. Likewise, if the rotor 26 is being rotated about the rotary axis 22, the contact wheel 32 is rotated about the contact axis 84 by virtue of the contact of the contact wheel 32 with the rotor 26.

Each contact wheel 32 is also disposed in a movable relationship on the radial distance RD to vary the rotary angular velocity. This means that the rotary angular velocity of the rotor 26 is varied by radially moving the contact wheel 32 on the radial distance RD. Therefore, the rotary angular velocity of the rotor 26 is increased as the contact wheel 32 is moved radially on the radial distance RD toward the interior radius IR to a smaller radial distance RD and the rotary angular velocity is decreased as the contact wheel 32 is moved radially on the radial distance RD toward the exterior radius ER to a larger radial distance RD. The rotary angular velocity of the first rotor 36 is varied with respect to the second rotor 38 by virtue of moving the contact wheels 32 radially along the respective rotors 26. Therefore, the contact angular velocity may also vary based on the location of the contact wheel 32 on the radial distance RD. For example, if the first rotor 36 is driving the second rotor 38 via the contact wheels 32 and the first rotor 36 is rotating at a constant rotary angular velocity, as the first contact wheel 40 is moved toward the exterior radius ER, the speed of the contact wheel 32 will increase. This increased speed of the contact wheels 32 translated to the second rotor 38 through the contact wheels.

Preferably, the contact wheels 32 are interconnected in a fixed rotational relationship. This means that not only do the contact wheels 32 rotate in unison with one another, but the contact wheels 32 move along the respective radial distance RD in unison. Therefore, the first and second contact axes 84 are aligned on the contact axis 84. Typically, the contact wheels 32 are interconnected by a rod 80 extending along the contact axis 84. The contact wheels 32 are affixed to rotate with the rod 80 about the contact axis 84. The rod 80 may be connected to an indexing device 86 which moves the rod 80 and the contact wheels 32 linearly along the respective radial distances RD. The rod 80 may also be connected to a driver motor 88 which rotates the rod 80 and the contact wheels. The driver motor 88 may be used to constantly rotate both rotors 26 or the driver motor may act as a starter motor which only rotates the rod 80 and contact wheels 32 until the rotary devices 20 "start" and are able to rotate on their own. It should be appreciated that the drive motor 88 may be any one or more of the starter, alternator, motor, generator, or drive shaft.

The first and second contact wheels 40, 42 are each movable on the respective radial distance RD to vary the first rotary angular velocity with respect to the second rotary angular velocity. Preferably, the first rotary axis 22 is aligned with the second rotary axis 22 such that the second rotor 38 is concentric with the first rotor 26, e.g. radially stacked, as shown in FIGS. 1 and 3-5. The first contact wheel 40 is disposed on the respective radial distance RD across the center C of the rotors 26 from the second contact wheel 42 which is disposed on the respective radial distance RD. For example, if the first rotor 36 is driving the second rotor 38 via the contact wheels, as the first contact wheel 40 is moved to decrease the radial distance RD on the first rotor 26, the other contact wheel 32 is moved to increase the radial distance RD on the second rotor 38. Alternatively, if the first and second contact wheels 40, 42 are disposed on the same sides of the center C of the rotors 26, as one of the angular velocities decreases, the other one of the angular velocities also decreases. This is because as the first contact wheel 40 is moved to decrease the radial distance RD on the first rotor 26, the second contact wheel 42 is moved to decrease the radial distance RD on the second rotor 38.

If the contact wheels 32 are driving both of the rotors 26, as one of the first and second rotary angular velocities increases, the other one of the first and second rotary angular velocity decreases. When the first contact wheel 40 is disposed on the respective radial distance RD across the center C of the rotors 26 from the second contact wheel 42 which is disposed on the respective radial distance RD, as the first contact wheel 40 is moved to decrease the radial distance RD on the first rotor 26, the other contact wheel 32 is moved to increase the radial distance RD on the second rotor 38. Alternatively, if the first and second contact wheels 40, 42 are disposed on the same sides of the center C of the rotors 26, as one of the rotary angular velocities decreases, the other one of the rotary angular velocities also decreases. This is because as the first contact wheel 40 is moved to decrease the radial distance RD on the first rotor 26, the second contact wheel 42 is moved to decrease the radial distance RD on the second rotor 38 and both of the angular velocities are reduced.

Figure 2:
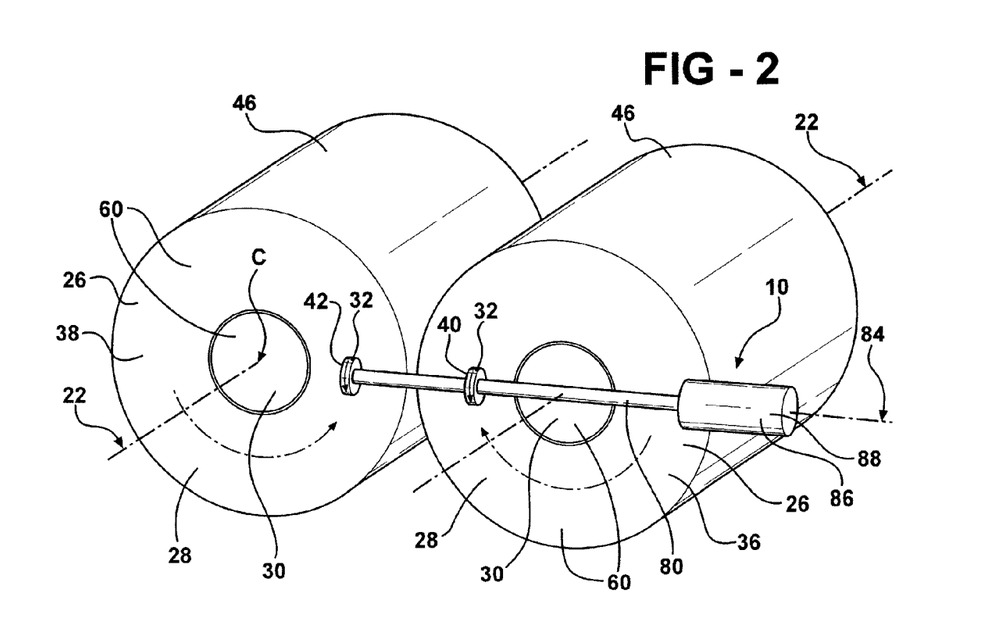
FIG. 2 is a perspective end view of a pair of adjacent rotary devices and the system for translating rotation between the rotors and the contact wheels.

It should be appreciated that the configuration is not limited to radially stacking the rotary devices 20. As an alternative embodiment, the first and second rotors 26 are disposed adjacent one another, as shown in FIG. 2.

Figure 3:
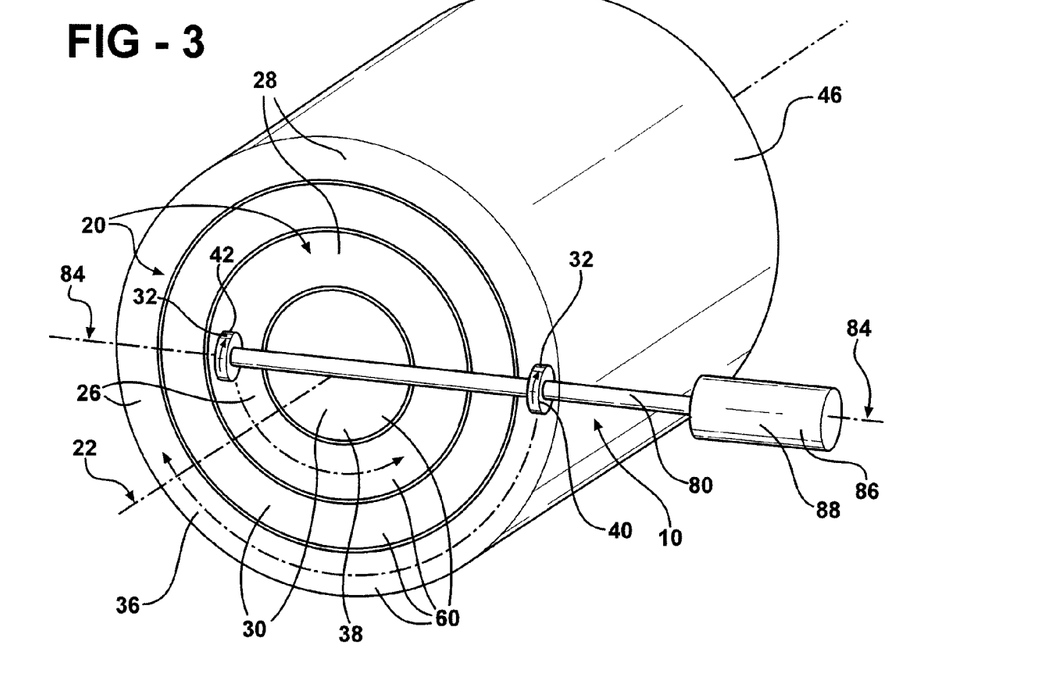
FIG. 3 is a perspective end view of the pair of radially stacked rotary devices and the system for translating rotation between the rotors and the contact wheels.
Figure 4:
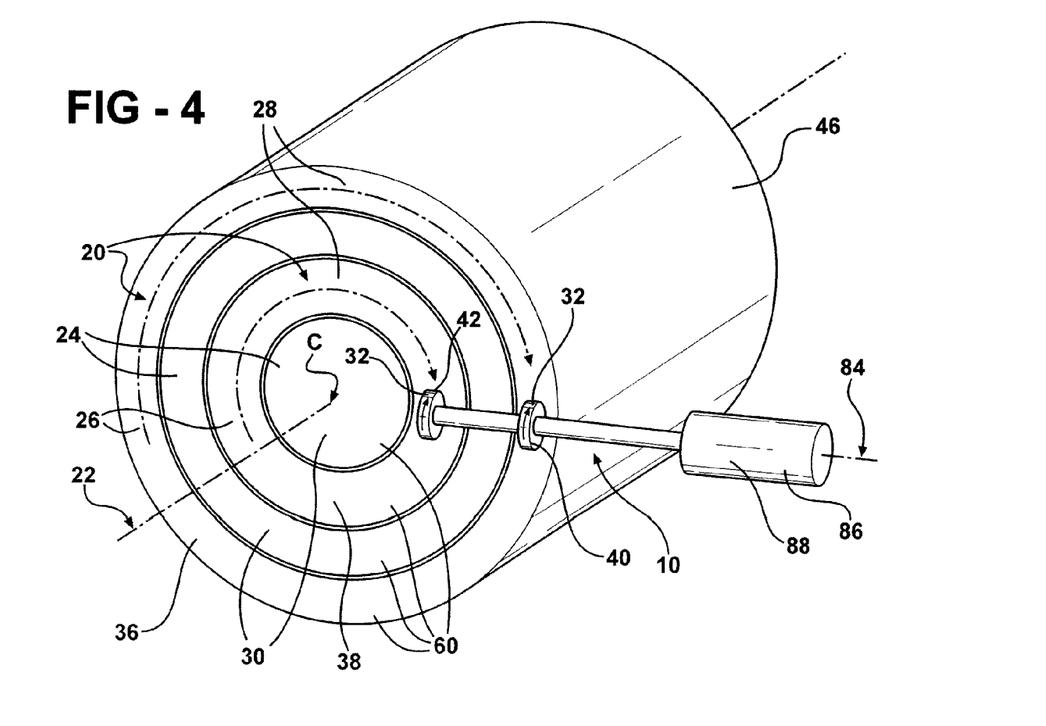
FIG. 4 is a perspective end view of the pair of radially stacked rotary devices and the system for translating rotation between the rotors and the contact wheels.

It may be preferable to counter rotate the rotors 26 with respect to one another to reduce or prevent balancing or vibrational issues between the two rotors 26. This means that the first rotor 36 rotates in an opposite direction from the second rotor 38. For example, when the rotary devices 20 are radially stacked and the first rotor 36 counter rotates with respect to the second rotor 26, a rotational energy between the two rotary devices 20 may effectively be cancelled out or at least significantly reduced. Counter rotation of the first and second rotary device 20, when radially stacked, is achieved based on the placement of the first and second contact wheels 40, 42. Referring to FIGS. 1 and 3, counter rotation between the first and second rotor 36, 38 is achieved by placing the first contact wheel 40 on the opposite side of the center C of the rotary devices 20 from the second contact wheel. Therefore, as the first and second contact wheels 40, 42 are rotating in the same direction, the first rotor 36 is rotating in a direction opposite from the second rotor 38. Conversely, referring to FIG. 4, rotation of the first and second rotors 26 in the same direction is achieved by placing the first and second contact wheels 40, 42 on the same side of the center C of the rotary devices 20. Therefore, as the first and second contact wheels 40, 42 are rotating the same direction, the first and second rotors 26 are also rotating in the same direction.

As another example, when the rotary devices 20 are disposed adjacent one another, counter rotation of the first rotor 36 with respect to the second rotor 38 is achieved based on the placement of the first and second contact wheels 40, 42. Referring to FIG. 2, counter rotation between the first and second rotor 36, 38 is achieved by placing the first and second contact wheels 40, 42 between the centers C of the first and second rotary devices 20. Alternatively, counter rotation is achieved by placing the first and second contact wheels 40, 42 on opposite sides of the centers C of the first and second rotary devices 20. Conversely, rotation of the first and second rotors 26 in the same direction is achieved by placing one of the contact wheels 32 on the respective rotor 26 between the centers C of the first and second rotary devices 20 and placing the other one of the contact wheels 32 on the other rotor 26 that is not between the centers C of the first and second rotary devices 20.

It should be appreciated that the invention is not limited to two rotors 26 and two contact wheels 32. For example, one rotor 26 and one contact wheel 32 may be used. If a single rotary device 20 includes the rotor 26 and stator 24 and is for compressing the fluid, i.e., a compressor, the compression may be varied based on where the contact wheel 32 is placed along the radial distance RD of the rotor 26. Alternatively, more than two rotor 26 and contact wheels 32 may be used. These rotors 26 may be radially stacked, placed adjacent one another, or a combination of both.

Radially stacking the rotary devices 20, and the associated rotors 26, provides the ability to use one or more of the rotors 26 as a power take off while the stator 24 remains stationary. For example, the radially stacked rotary devices 20 may be used as a wheels and an engine all in one where compression and expansion take place within the rotary devices 20 and the speed of the wheel is varied by virtue of moving the contact wheels 32 along the radial distances RD of the rotors 26. Alternatively, the radially stacked rotary devices 20 may be used as a power generator where magnets and coil are used to generate power by virtue of the rotor 26 rotation. Again, the amount of power generated may be varied by virtue of moving the contact wheels 32 along the radial distances RD of the rotors 26.

Whatever the configuration of the rotors 26 with respect to one another, a drive shaft may extend from one of the rotors 26 to translate the rotary angular velocity into power. For examples, the rotors 26 may be radially stacked and mounted within a motor vehicle with the drive shaft extending from both sides of the rotors 26. Wheels are attached at the drive shaft at both sides of the rotors 26. The motor vehicle would be powered generated to the drive shaft by virtue of rotor 26 rotation. The speed of rotation of the drive shaft may be varied based on moving the contact wheels 32 along the radial distances RD of the rotors 26.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A system for continuously varying relative angular rotation between two cooperating rotary devices each independently working a fluid therein, said system comprising:
   a first rotary device for working a fluid therein, said first rotary device including a first rotor rotatable about a first rotary axis at a first rotary angular velocity;
   a second rotary device for working a fluid therein, said second rotary device including a second rotor rotatable about a second rotary axis at a second rotary angular velocity;
   a first contact wheel disposed in rotational contact with said first rotor at a given radial distance from said first rotary axis;
   a second contact wheel disposed in rotational contact with said second rotor at a given radial distance from said second rotary axis;
   a member operatively interconnecting said first and second contact wheels in a fixed rotational relationship; and
   an indexing device for moving at least one of said first and second contact wheels relative to said respective first and second rotary axes while maintaining rotational contact with said respective first and second rotors for varying the rotary angular velocity of said first rotary device relative to said second rotary device.

2. A system as set forth in claim 1 wherein:
   said first rotor includes a first radial distance extending between a first exterior radius and a first interior radius with said first exterior radius being larger than said first interior radius;
   said second rotor includes a second radial distance extending between a second exterior radius and a second interior radius with said second exterior radius being larger than said second interior radius;
   said first contact wheel rotatable about a first contact axis extending in parallel relationship to said first radial distance; and
   a second contact wheel rotatable about a second contact axis extending in parallel relationship to said second radial distance.

3. A system as set forth in claim 2 wherein said first and second contact axes extend transverse to said first and second rotary axes, respectively.

4. A system as set forth in claim 2 wherein said first and second contact wheels are each movable radially on said respective first and second radial distance to vary one of the first and second rotary angular velocities with respect to the other one of the first and second rotary angular velocities.

5. A system as set forth in claim 2 wherein said first contact axis is aligned with said second contact axis.

6. A system as set forth in claim 2 wherein said member operatively interconnecting said first and second contact wheels comprises a straight rod interconnecting said contact wheels.

7. A system as set forth in claim 2 wherein said first rotary axis is aligned with said second rotary axis and said second rotor is concentric with said first rotor.

8. A system as set forth in claim 7 wherein said first contact wheel is disposed on said first radial distance across a center of said first and second rotors from said second contact wheel disposed on said second radial distance such that said first and second rotor counter rotate relative to one another.

9. A method of continuously varying relative angular rotation between two cooperating rotary devices each independently working a fluid therein, said method comprising the steps of:
   providing a first rotary device for working a fluid, the first rotary device having a first rotor rotatable about a first rotary axis at a first rotary angular velocity;
   providing a second rotary device for working a fluid therein, the second rotary device including a second rotor rotatable about a second rotary axis at a second rotary angular velocity;
   placing a first contact wheel into rotational contact with the first rotor at a given radial distance from the first rotary axis;
   placing a second contact wheel into rotational contact with the second rotor at a given radial distance from the second rotary axis;
   operatively interconnecting the first and second contact wheels in a fixed rotational relationship; and
   moving at least one of the first and second contact wheels relative to the respective first and second rotary axes while maintaining rotational contact with the respective first and second rotors to vary the rotary angular velocity of the first rotary device relative to the second rotary device.

10. A method as set forth in claim 9 wherein said step of moving includes moving the first contact wheel radially toward the first rotary axis and moving the second contact wheel radially away from the second rotary axis.

11. A method as set forth in claim 9 including supporting the first rotary axis coincident with the second rotary axis so that the first and second rotary devices each rotate about a common, aligned axis.

12. A method as set forth in claim 9 including supporting the first rotary axis spaced parallel to the second rotary axis so that the first and second rotary devices each rotate about respective axes maintained parallel to one another.

* * * * *

UNITED STATES PATENT AND TRADEMARK OFFICE
CERTIFICATE OF CORRECTION

PATENT NO.        : 7,650,754 B2                                              Page 1 of 1
APPLICATION NO. : 11/532385
DATED             : January 26, 2010
INVENTOR(S)       : Gilbert Staffend It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 492 days.

Signed and Sealed this

Twenty-third Day of November, 2010

David J. Kappos
*Director of the United States Patent and Trademark Office*